(12) United States Patent
Takahashi et al.

(10) Patent No.: US 8,265,795 B2
(45) Date of Patent: Sep. 11, 2012

(54) MASS FLOW CONTROLLER

(75) Inventors: Akito Takahashi, Otsu (JP); Yukimasa Furukawa, Kusatsu (JP); Yuki Tanaka, Kyoto (JP)

(73) Assignee: Horiba STEC, Co., Ltd., Kyoto-shi (JP)

( * ) Notice: Subject to any disclaimer, the term of this patent is extended or adjusted under 35 U.S.C. 154(b) by 303 days.

(21) Appl. No.: 12/613,397

(22) Filed: Nov. 5, 2009

(65) Prior Publication Data

US 2011/0106319 A1    May 5, 2011

(51) Int. Cl.
*G05D 7/00* (2006.01)
*F17D 3/00* (2006.01)

(52) U.S. Cl. .................. 700/282; 137/1; 137/2

(58) Field of Classification Search ............. 700/282; 137/1, 2
See application file for complete search history.

(56) References Cited

U.S. PATENT DOCUMENTS

| | | | | |
|---|---|---|---|---|
| 5,567,227 | A * | 10/1996 | Henderson | 95/22 |
| 6,439,254 | B1 * | 8/2002 | Huang et al. | 137/10 |
| 6,939,111 | B2 * | 9/2005 | Huitt et al. | 417/42 |
| 7,881,829 | B2 * | 2/2011 | Yoneda et al. | 700/282 |
| 7,905,139 | B2 * | 3/2011 | Lull | 73/202.5 |
| 2009/0312876 | A1 * | 12/2009 | Yoneda et al. | 700/282 |

FOREIGN PATENT DOCUMENTS

| | | |
|---|---|---|
| JP | 62-160667 | 7/1987 |
| JP | 05-088705 | 4/1993 |
| JP | 2004-280689 A | 10/2004 |
| JP | 2007-034550 | 2/2007 |

\* cited by examiner

*Primary Examiner* — Mohammad Ali
*Assistant Examiner* — Sivalingam Sivanesan
(74) *Attorney, Agent, or Firm* — Alleman Hall McCoy Russell & Tuttle LLP

(57) ABSTRACT

To improve PI performance of a mass flow controller, the mass flow controller changes a proportional coefficient, an integral coefficient, and a derivative coefficient used for PID operation in a stable state based on at least two out of a primary pressure, a time change amount of the primary pressure, and a flow rate set value.

2 Claims, 5 Drawing Sheets

MASS FLOW CONTROLLER

FIELD OF THE ART

The present invention relates to a mass flow controller controlling a flow rate of such a fluid as gas or liquid.

BACKGROUND ART

If various types of gases used for, for example, semiconductor manufacturing are to be supplied to a semiconductor manufacturing device, mass flow controllers are provided on supply channels corresponding to the gases so as to regulate flow rates of the gases, respectively. Conventionally, a pressure regulator is attached to each mass flow controller in series so as to prevent extreme change in an internal pressure of the supply channel of each mass flow controller, thereby simplifying flow rate control.

Flow rate control of each of the mass flow controllers is basically PID control. As a mass flow controller of this type, there is known a mass flow controller exercising a feedback control by changing over PID coefficients between a transitional response state and a stable state, as disclosed in, for example, Patent document 1.

Specifically, the mass flow controller disclosed in Patent document 1 uses values obtained by assigning a flow rate set value to a predetermined function as gain values, respectively by which a deviation is multiplied in proportional operation. For example, a lower value is obtained by the predetermined function used in the stable state if the assigned flow rate set value is lower. That is, the conventional mass flow controller disclosed in Patent document 1 only changes a proportional coefficient, an integral coefficient, and a derivative coefficient (which coefficients will be also referred to as "PID coefficients", hereinafter) by making the PID coefficients only in proportion to the flow rate set value.

However, the inventor of the present application obtained the following experimental result. In the stable state, optimum PID coefficients differ between a time a primary pressure rises and a time the primary pressure falls. Even if a time change amount of the primary pressure is the same, the PID coefficients differ as long as the primary pressure before change differs. Furthermore, a linear relation is not held among the flow rate set value and the optimum PID coefficient values. As a result, the inventor discovered that there is a limit to improvement in PI (Pressure Insensitive) performance only by making the PID coefficients in proportion to the flow rate set value in the stable state.

Patent document 1: Japanese Unexamined Patent Publication No. 2007-34550

DISCLOSURE OF THE INVENTION

Problems to be Solved by the Invention

The present invention has been made to solve the conventional problems. It is an object of the present invention to further improve PI performance of a mass flow controller.

Means to Solve the Problems

According to an aspect of the present invention, there is provided a mass flow controller including: a flow rate sensor part measuring a flow rate of a fluid flowing in a channel, and outputting a flow rate measurement signal indicating a measurement value of the flow rate; a flow rate control valve provided upstream or downstream of the flow rate sensor part; a calculation part performing PID operation on a deviation between a flow rate measurement value indicated by the flow rate measurement signal and a flow rate set value serving as a target value, and calculating a feedback control value to be fed back to the flow rate control valve; and an opening control signal output part generating an opening control signal based on the feedback control value, and outputting the opening control signal to the flow rate control valve, wherein the calculation part changes a proportional coefficient, an integral coefficient, and a derivative coefficient used for the PID operation in a stable state based on at least two out of a primary pressure, a time change amount of the primary pressure, and the flow rate set value.

The mass flow controller stated above changes the proportional coefficient, the integral coefficient, and the derivative coefficient used for the PID operation in the stable state based on at least two out of the primary pressure, the time change amount of the primary pressure, and the flow rate set value. Therefore, as compared with the conventional method of changing the proportional coefficient, the integral coefficient, and the derivative coefficient in proportion to the flow rate set value using the flow rate set value, it is possible to obtain an optimum proportional coefficient, an optimum integral coefficient, and an optimum derivative coefficient. As a consequence, the mass flow controller can perform stable flow rate control while being hardly influenced by a pressure change of the primary pressure.

In particular, the optimum proportional coefficient, the optimum integral coefficient, and the optimum derivative coefficient differ between the time the primary pressure rises and the time the primary pressure falls in the stable state. It is, therefore, preferable that the calculation part changes the proportional coefficient, the integral coefficient, and the derivative coefficient depending on whether the time change amount of the primary pressure is positive or negative.

To obtain an optimum proportional coefficient, an optimum integral coefficient, and an optimum derivative coefficient, and to perform stable flow rate control while being hardly influenced by the pressure change of the primary pressure, it is preferable that the calculation part changes the proportional coefficient, the integral coefficient, and the derivative coefficient depending on whether the time change amount of the primary pressure is positive or negative, changes the proportional coefficient, integral coefficient, and derivative coefficient based on whether the time change amount of the primary pressure is positive or negative by performing predetermined operation on the proportional coefficient, integral coefficient, and derivative coefficient using values obtained by assigning the flow rate set value to a predetermined function, respectively, and changes the proportional coefficient, integral coefficient, and derivative coefficient based on the flow rate set value by performing predetermined operation on the proportional coefficient, integral coefficient, and derivative coefficient using values obtained by assigning the primary pressure to a predetermined function, respectively.

Effect of The Invention

The present invention constituted as stated above can improve the PI performance of the mass flow controller.

BEST MODE FOR CARRYING OUT THE INVENTION

A mass flow meter 100 according to an embodiment of the present invention will be described hereinafter referring to the drawings.

CONFIGURATION OF THE DEVICE

Figure 1:
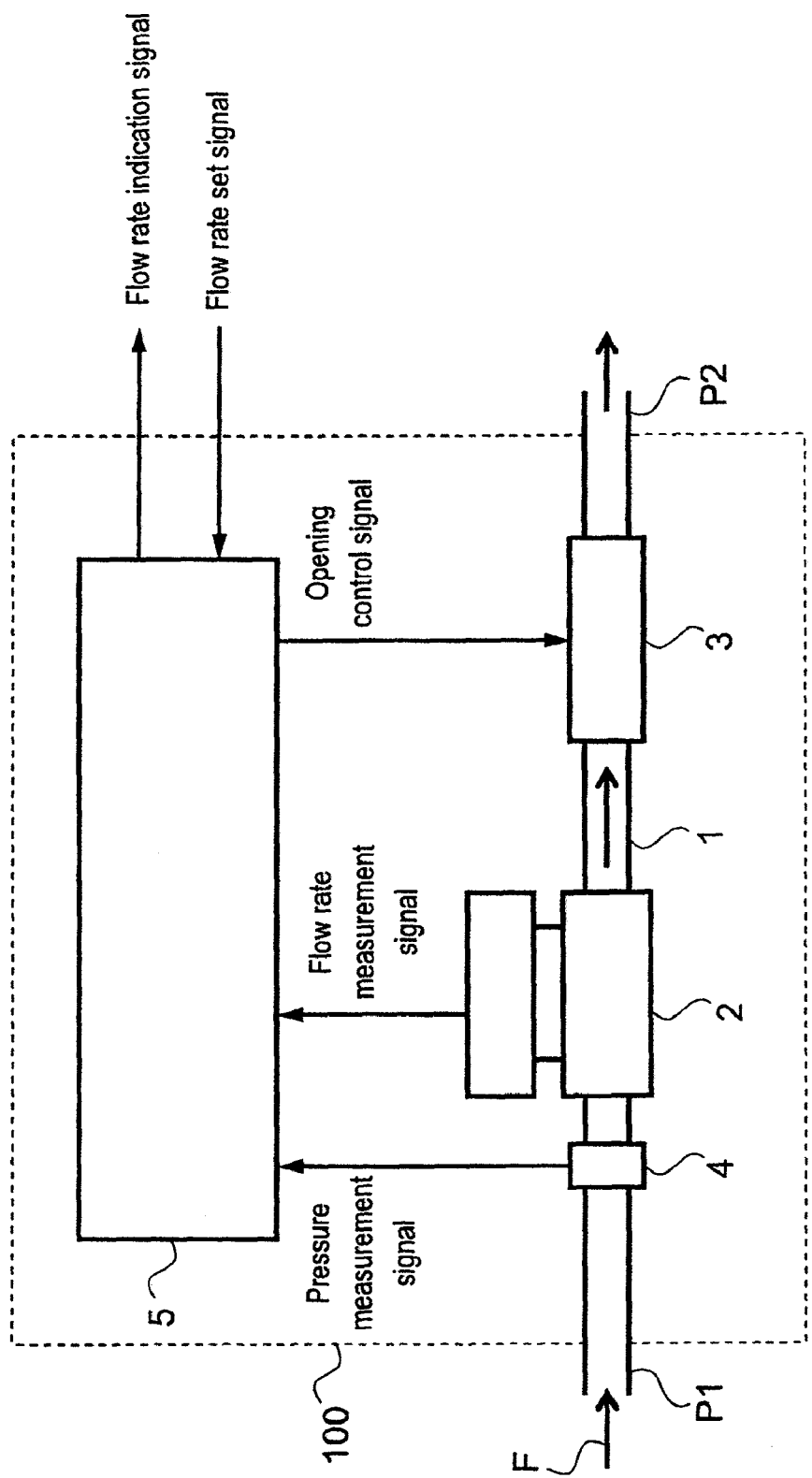
FIG. 1 is an overall pattern diagram of a mass flow controller according to the present embodiment of the present invention.

As shown in the pattern diagram of FIG. 1, the mass flow controller 100 according to the present embodiment includes an internal channel 1, a flow rate sensor part 2 measuring a flow rate of a fluid F flowing in the internal channel 1, a flow rate control valve 3 provided, for example, downstream of the flow rate sensor part 2, a pressure sensor part 4 provided upstream of the flow rate sensor part 2 and the flow rate control valve 3, and a control part 5. The mass flow controller 100 is used in a system supplying gas to a chamber used in a semiconductor process as shown in, for example, FIG. 2.

Figure 2:
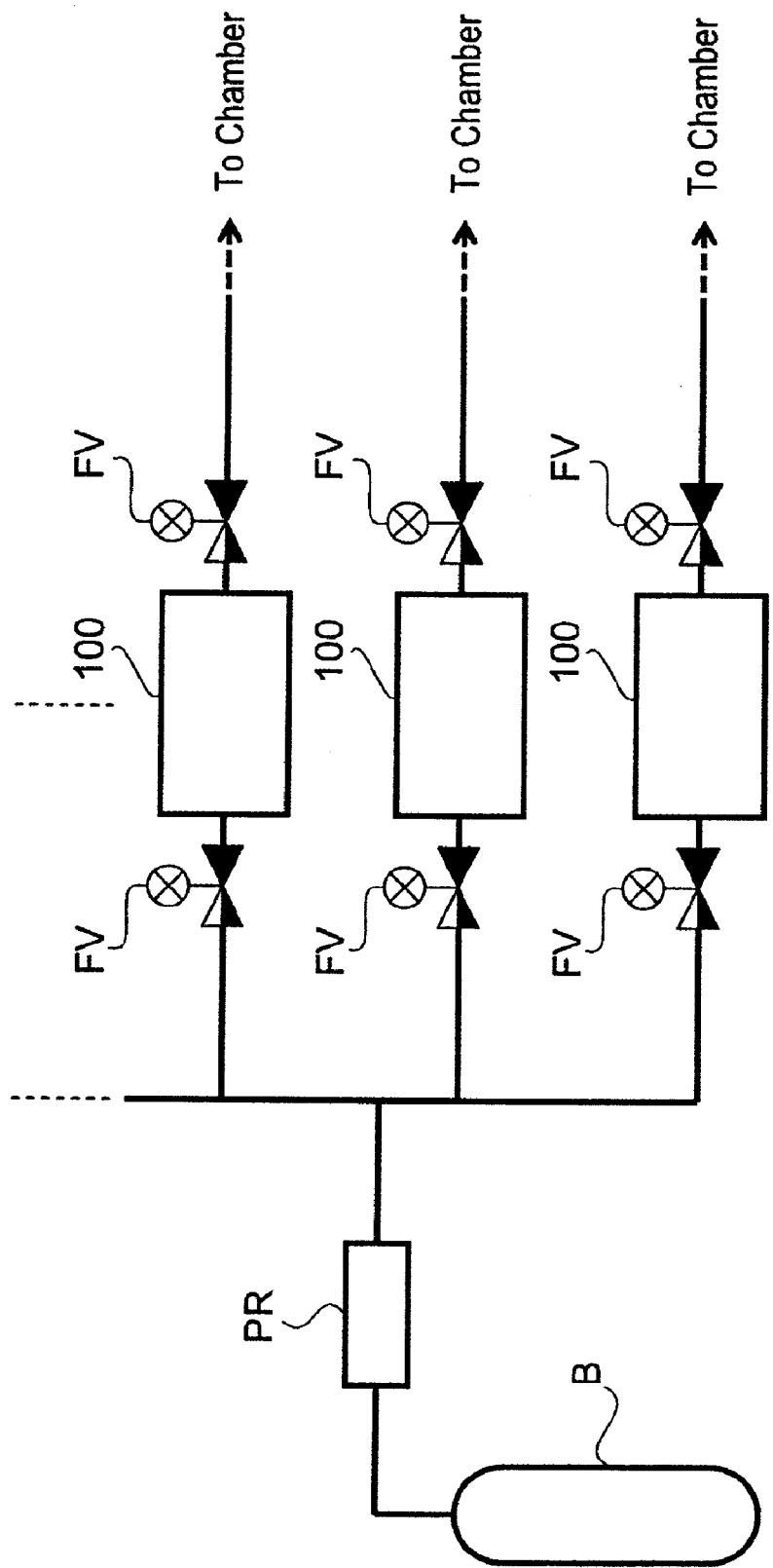
FIG. 2 is a schematic diagram showing an example of a configuration of a flow rate control system using the mass flow controller.

The constituent elements of the mass flow controller 100 will be described. The internal channel 1 has an upstream end serving as an inlet port P1 and a downstream end serving as a discharge port P2. Both the inlet port P1 and the discharge port P2 are open. For example, a fluid supply source B such as a cylinder is connected to the inlet port P1 via an external pipe, and the chamber (not shown) for semiconductor manufacturing is connected to the discharge port P2 via an external pipe. In the present embodiment, one fluid supply source B branches out into a plurality of pipes and the mass flow controllers 100 are provided at the pipes, respectively, as shown in FIG. 2. A pressure regulator PR is provided only at an outlet of the fluid supply source B and no pressure regulator is provided at each pipe for each mass flow controller 100. Reference symbol FV denotes an air valve.

Although not shown in detail, the flow rate sensor part 2 includes, for example, a pair of heat sensitive sensors (thermal sensors) provided in the channel 1. These paired heat sensitive sensors detect an instantaneous flow rate of the fluid F as an electric signal, and an internal electric circuit of the flow rate sensor part 2 makes amplification or the like of the electric signal. The flow rate sensor part 2 thereby outputs the resultant electric signal as a flow rate measurement signal having a value according to the detected flow rate.

Although not shown in detail, similarly to the flow rate sensor part 2, the flow rate control valve 3 is configured so that an actuator constituted by a piezoelectric element can change, for example, an opening of the flow rate control valve 3. By applying an opening control signal that is an external electric signal to the flow rate control valve 3, the actuator is driven to adjust the opening according to a value of the opening control signal and the flow rate control valve 3 controls the flow rate of the fluid F.

Although not shown in detail, the pressure sensor part 4 includes, for example, a diaphragm (such as a stainless diaphragm or a silicon diaphragm) and a pressure sensitive element measuring a displacement of the diaphragm. This pressure sensitive element detects the displacement of the diaphragm as an electric signal, and an internal electric circuit of the pressure sensor part 4 makes amplification or the like of the electric signal. The pressure sensor part 4 thereby outputs the resultant electric signal as a pressure measurement signal having a value according to the detected flow rate.

The control part 5 is configured to include a CPU, a memory, and a digital electric circuit or an analog electric circuit including an A/D converter, a D/A converter and the like. The control part 5 may be either a dedicated control part to each mass flow controller 100 or realized by using a general-purpose computer such as a personal computer partially or entirely. Alternatively, the control part 5 may be configured to fulfill functions of respective constituent elements, to be described later, of the control part 5 only by using the analog circuit without using the CPU. The control part 5 does not need to be physically integrated but may be constituted by a plurality of devices that are wired or wirelessly connected to one another.

Figure 3:
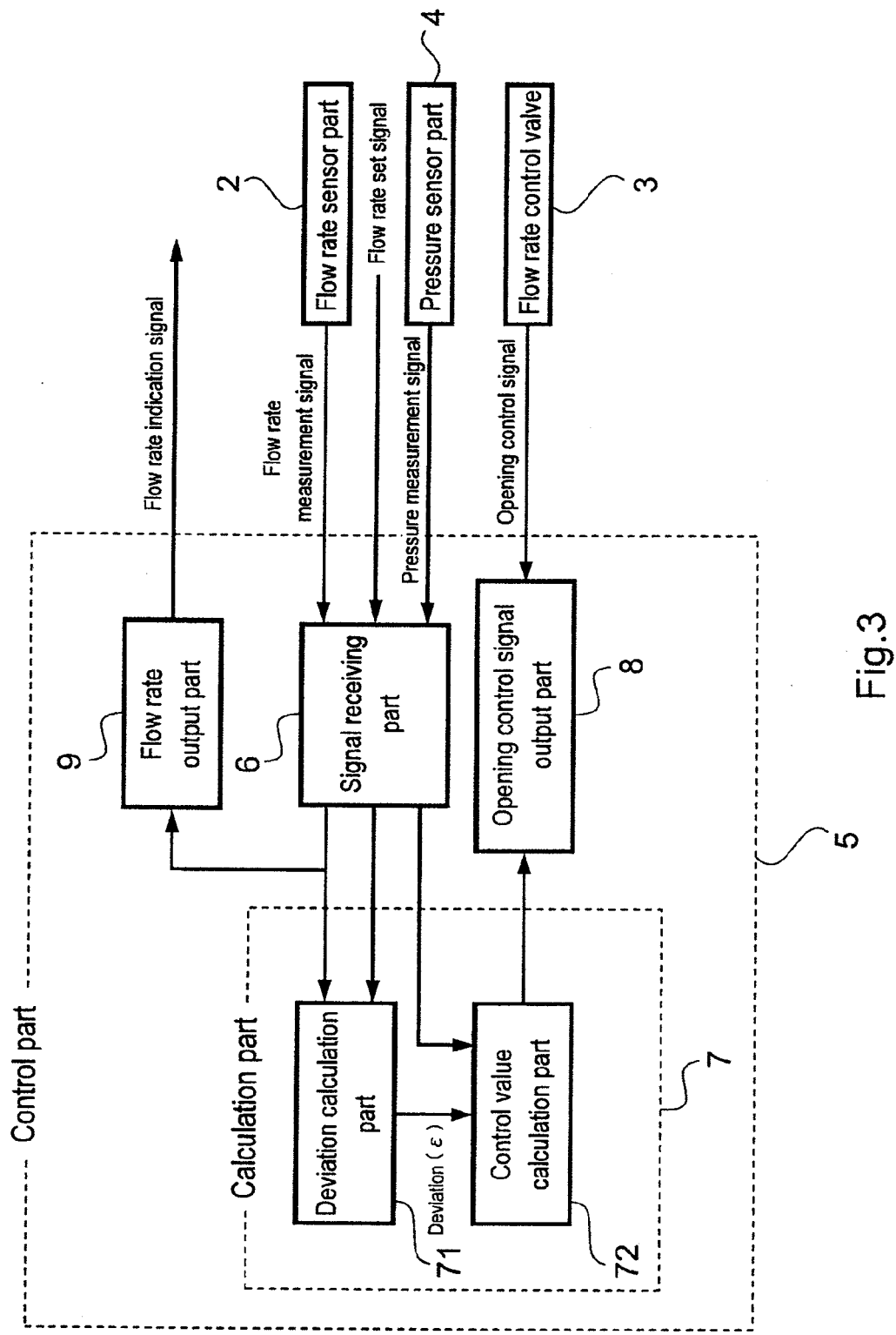
FIG. 3 is a functional block diagram of a control part.

Further, a predetermined program is stored in the memory of the control part 5 and the CPU and peripherals of the CPU are allowed to operate in cooperation with one another according to the program. By doing so, this control part 5 is configured to fulfill at least functions of a signal receiving part 6, a calculation part 7, an opening control signal output part 8, and a flow rate output part 9, as shown in FIG. 3.

The signal receiving part 6 receives the flow rate measurement signal transmitted from the flow rate sensor part 2, a flow rate setting signal or the like input to the signal receiving part 6 from another computer or the like, and the pressure measurement signal transmitted from the pressure sensor part 4, and stores values of these signals in a predetermined region of, for example, the memory.

The calculation part 7 includes a deviation calculation part 71 that acquires the flow rate measurement value indicated by the flow rate measurement signal and that calculates a deviation between the flow rate measurement value and a target value, that is, a flow rate set value indicated by the flow rate setting signal, and a control value calculation part 72 that performs PID operation on the deviation and that calculates a feedback control value to be fed back to the flow rate control valve 3.

The opening control signal output part 8 generates an opening control signal having a value based on the feedback control value, and outputs the opening control signal to the flow rate control valve 3.

The flow rate output part 9 performs predetermined operation on the flow rate measurement value to calculate a flow rate indication value, and outputs a flow rate indication signal (an analog signal or a digital signal) having the flow rate indication value as a value so that the flow rate indication signal can be used outside.

In the present embodiment, therefore, the control value calculation part 72 changes a proportional coefficient (P), an integral coefficient (I), and a derivative coefficient (D) (that is, PID coefficients used for PID control in the stable state) used for PID operation in a state in which the fluid F flows at a stable flow rate (in a stable state), based on a primary pressure (supply-side pressure) as well as a time change amount of the primary pressure and the flow rate set value. The stable state is a state in a period of time other than a change period (such as about two seconds) that is a predetermined period of time from time when the flow rate set value changes by a predetermined amount or more per unit time. In the stable state, the flow rate set value hardly changes. Further, the predetermined amount means a % value of about 0% to 10% with respect to a full scale and is preferably 0.3% to 5%. The predetermined period means about a few seconds or, to be specific, about 0 seconds to 10 seconds, and is preferably about 0.3 seconds to 5 seconds.

More specifically, the control value calculation part 72 changes the proportional coefficient, the integral coefficient, and the derivative coefficient (hereinafter, also "PID coefficients"), depending on whether the time change amount of the primary pressure (pressure upstream of the mass flow controller) is positive or negative. The control value calculation part 72 further changes the resultant PID coefficients by calculating the changed PID coefficients using values obtained by assigning the flow rate set value to a predetermined function, respectively. The control value calculation part 72 further changes the resultant PID coefficients by calculating the changed PID coefficients using values obtained by assigning the primary pressure to a predetermined function, respectively. Furthermore, the control value calculation part 72 uses different functions characteristic of the flow rate set value and characteristic of the primary pressure, depending on whether the time change amount of the primary pressure is positive or negative, that is, depending on whether $dp/dt>0$ or $dp/dV\leqq 0$.

Figure 4:
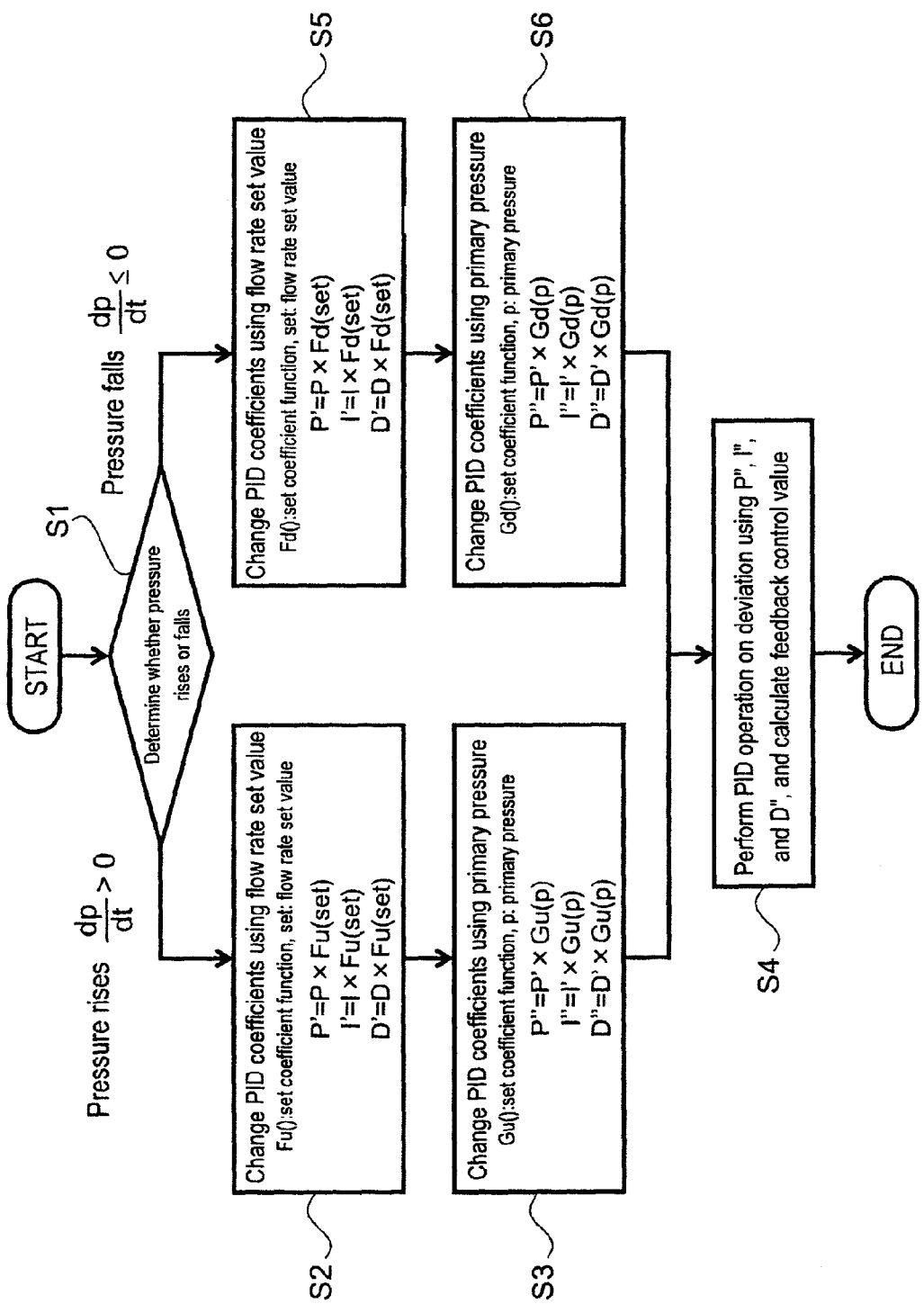
FIG. 4 is a flowchart showing procedures of changing PID coefficients.

A specific changing method adopted by the control value calculation part 72 will be described referring to FIG. 4.

First, the control value calculation part 72 acquires the pressure measurement signal corresponding to the primary pressure and obtained by the pressure sensor part 4, and calculates the primary pressure and the time change amount of the primary pressure.

The control value calculation part 72 determines whether the time change amount of the primary pressure is positive or negative (step S1). If the time change amount of the primary pressure is positive ($dp/dt>0$), that is, if the primary pressure rises, the control value calculation part 72 changes the PID coefficients based on the flow rate set value using the following Equations (1) to (3), respectively (step S2).

$$P'=P\times Fu(\text{set}) \quad (1)$$

$$I'=I\times Fu(\text{set}) \quad (2)$$

$$D'=D\times Fu(\text{set}) \quad (3)$$

Figure 5:
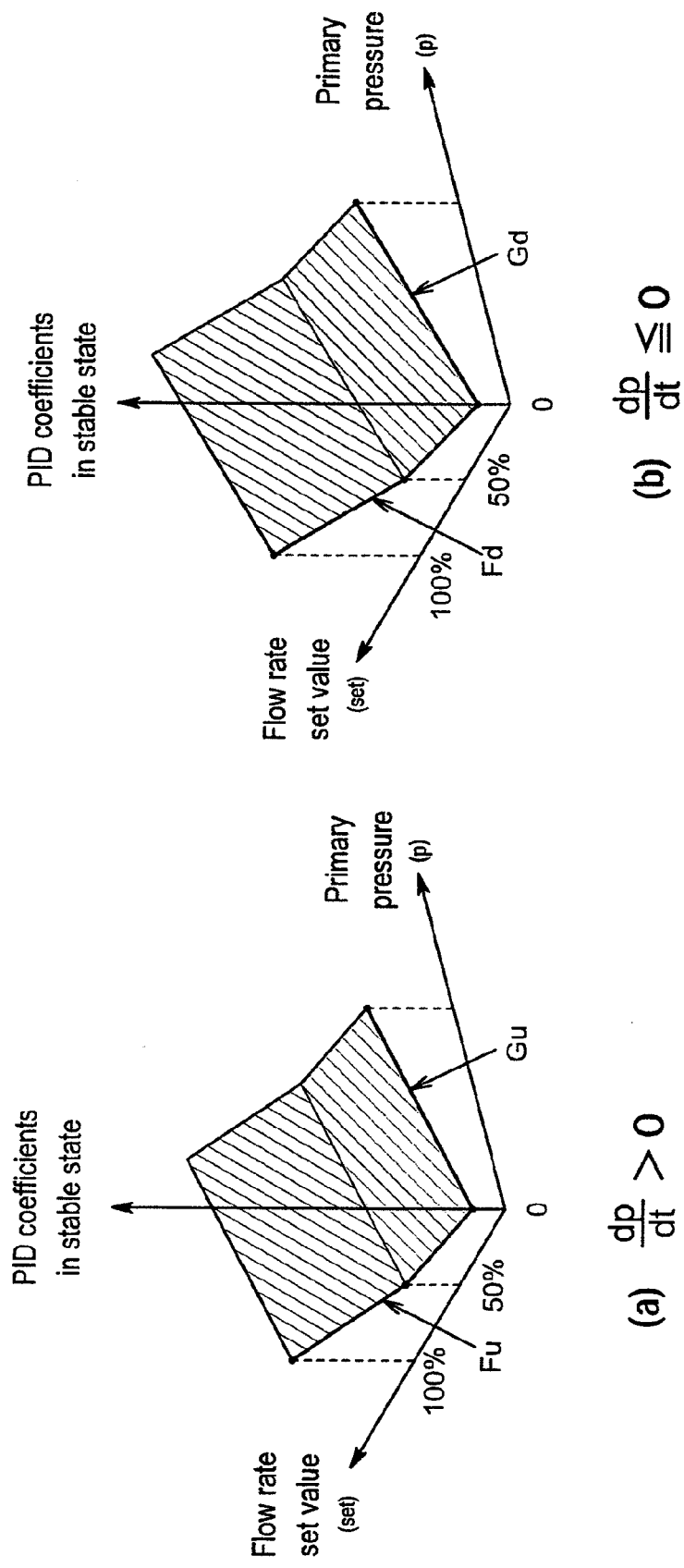
FIGS. 5A and 5B are pattern diagrams showing functions used to change the PID coefficients.

In the Equations (1) to (3), Fu( ) indicates a set coefficient function that is a function characteristic of the flow rate set value and symbol 'set' indicates the flow rate set value. The set coefficient function Fu according to the present embodiment is a broken line function for which a proportional constant at the flow rate set value of 0% to 50% differs from that at the flow rate set value of 50% to 100% as shown in FIG. 5A. A broken line shape of the function is not limited to that shown in FIG. 5A but can be appropriately changed. A curved function can be used as this set coefficient function Fu. However, if the set coefficient function Fu is a curved function, an arithmetic processing amount disadvantageously increases and it is disadvantageously difficult to adjust the PID coefficients.

Next, the control value calculation part 72 changes P'I'D' coefficients obtained by the Equations (1) to (3) based on the primary pressure using the following Equations (4) to (6), respectively (step S3).

$$P''=P'\times Gu(p) \quad (4)$$

$$I''=I'\times Gu(p) \quad (5)$$

$$D''=D'\times Gu(p) \quad (6)$$

In the Equations (4) to (6), Gu( ) indicates a pressure coefficient function that is a characteristic function of the primary pressure and symbol 'p' indicates the primary pressure. As shown in FIG. 5A, the pressure coefficient function Gu according to the present embodiment is a proportional function for calculating a value proportional to an input primary pressure. A broken line function or a curved function can be used as this set coefficient function Gu. However, if the pressure coefficient function Gu is a curved function, an arithmetic processing amount disadvantageously increases and it is disadvantageously difficult to adjust the PID coefficients.

In this way, the control value calculation part 72 changes the coefficients P, I, and D to P'', I'', and D'' based on the flow rate set value and the primary pressure if the time change amount of the primary pressure is positive. Further, the control value calculation part 72 performs PID operation on the deviation using the PID coefficients (proportional coefficient P'', the integral coefficient I'', and the derivative coefficient D''), thereby calculating a feedback control value (step S4).

On the other hand, if determining that the change amount of the primary pressure is negative, that is, the primary pressure falls, the control value calculation part 72 changes the PID coefficients based on the flow rate set value using the following Equations (step S5).

$$P'=P\times Fd(\text{set}) \quad (7)$$

$$I'=I\times Fd(\text{set}) \quad (8)$$

$$D'=D\times Fd(\text{set}) \quad (9)$$

In the Equations (7) to (9), Fd( ) indicates a set coefficient function that is a function characteristic of the flow rate set value and symbol 'set' indicates the flow rate set value. As shown in FIG. 5B, the set coefficient function Fd according to the present embodiment is a broken line function similarly to the set coefficient function Fu. However, the set coefficient function Fd differs from the set coefficient function Fu in bending points and proportional constants. A curved function can be used as this set coefficient function Fd. However, if the set coefficient function Fd is a curved function, an arithmetic processing amount disadvantageously increases and it is disadvantageously difficult to adjust the PID coefficients.

Next, the control value calculation part 72 changes P'I'D' coefficients obtained by the Equations (7) to (9) based on the primary pressure using the following Equations, respectively (step S6).

$$P''=P'\times Gd(p) \quad (10)$$

$$I''=I'\times Gd(p) \quad (11)$$

$$D''=D'\times Gd(p) \quad (12)$$

In the Equations (10) to (12), Gd( ) indicates a pressure coefficient function that is a characteristic function of the primary pressure and symbol 'p' indicates the primary pressure. As shown in FIG. 5B, the pressure coefficient function Gd according to the present embodiment is a proportional function similarly to the pressure coefficient function Fd. However, the pressure coefficient function Gd differs the pressure coefficient function Fd in proportional constants. A broken line function or a curved function can be used as this pressure coefficient function Gd. However, if the pressure coefficient function Gd is a curved function, an arithmetic processing amount disadvantageously increases and it is disadvantageously difficult to adjust the PID coefficients.

In this way, the control value calculation part 72 changes the coefficients P, I, and D to P'', I'', and D'' based on the flow rate set value and the primary pressure if the time change amount of the primary pressure is negative. Further, the control value calculation part 72 performs PID operation on the deviation using the PID coefficients (proportional coefficient P'', the integral coefficient I'', and the derivative coefficient D''), thereby calculating a feedback control value (step S4).

Effects of the Embodiment

The mass flow controller 100 according to the present embodiment configured as stated above changes the proportional coefficient, the integral coefficient, and the derivative coefficient used for the PID operation in the stable state based on the primary pressure, the time change amount of the primary pressure, and the flow rate set value. Therefore, as compared with the conventional method of changing the proportional coefficient, the integral coefficient, and the derivative coefficient in proportion to the flow rate set value using the flow rate set value, it is possible to obtain an optimum proportional coefficient, an optimum integral coefficient, and an optimum derivative coefficient. As a consequence, the mass flow controller 100 can perform stable flow rate control while being hardly influenced by a pressure change of the primary pressure.

Other Embodiments

The present invention is not limited to the embodiment. In the description, members or parts corresponding to those according to the embodiment are denoted by the same reference symbols, respectively.

For example, according to the embodiment described above, the mass flow controller 100 changes the PID coefficients based on all the primary pressure, the time change amount of the primary pressure, and the flow rate set value. Alternatively, the mass flow controller 100 can change the PID coefficients based on a combination of two out of the primary pressure, the time change amount of the primary pressure, and the flow rate set value such as a combination of the primary pressure and the time change amount of the primary pressure or a combination of the primary pressure and the flow rate set value.

Moreover, according to the embodiment, procedures of changing the PID coefficients are carried out in order of "changing PID coefficients based on the time change amount of the primary pressure", "changing PID coefficients based on the flow rate set value", and "changing PID coefficients based on the primary pressure". However, the present invention is not limited to the embodiment. The procedures may be carried out in order of a combination other than that according to the embodiment.

Furthermore, the control valve may be provided upstream of the flow rate sensor part. The flow rate sensor part is not limited to the thermal sensor but may be a sensor based on another flow rate measurement method such as a differential pressure sensor.

Needless to say, the embodiment and the modifications can be appropriately combined either partially or entirely, and the present invention is not limited to the embodiment and modifications but can be variously modified without departure from the scope of the invention.

EXPLANATION OF REFERENCE CHARACTERS

100 . . . Mass flow controller
1 . . . Internal channel
2 . . . Flow rate sensor part
3 . . . Flow rate control valve
7 . . . Calculation part
8 Opening control signal output part

The invention claimed is:

1. A mass flow controller comprising:
a flow rate sensor part measuring a flow rate of a fluid flowing in a channel, and outputting a flow rate measurement signal indicating a measurement value of the flow rate;
a flow rate control valve provided upstream or downstream of the flow rate sensor part;
a calculation part performing PID operation on a deviation between the flow rate measurement value indicated by the flow rate measurement signal and a flow rate set value serving as a target value, and calculating a feedback control value to be fed back to the flow rate control valve; and
an opening control signal output part generating an opening control signal based on the feedback control value, and outputting the opening control signal to the flow rate control valve, wherein
the calculation part changes a proportional coefficient, an integral coefficient, and a derivative coefficient used for the PID operation in a stable state based on at least two out of a primary pressure, a time change amount of the primary pressure, and the flow rate set value, wherein
the calculation part changes the proportional coefficient, the integral coefficient, and the derivative coefficient depending on whether the time change amount of the primary pressure is positive or negative.

2. A mass flow controller comprising:
a flow rate sensor part measuring a flow rate of a fluid flowing in a channel, and outputting a flow rate measurement signal indicating a measurement value of the flow rate;
a flow rate control valve provided upstream or downstream of the flow rate sensor part;
a calculation part performing PID operation on a deviation between the flow rate measurement value indicated by the flow rate measurement signal and a flow rate set value serving as a target value, and calculating a feedback control value to be fed back to the flow rate control valve; and
an opening control signal output part generating an opening control signal based on the feedback control value, and outputting the opening control signal to the flow rate control valve, wherein
the calculation part changes a proportional coefficient, an integral coefficient, and a derivative coefficient used for the PID operation in a stable state based on at least two out of a primary pressure, a time change amount of the primary pressure, and the flow rate set value, wherein
the calculation part changes the proportional coefficient, the integral coefficient, and the derivative coefficient depending on whether the time change amount of the primary pressure is positive or negative, changes the proportional coefficient, integral coefficient, and derivative coefficient based on whether the time change amount of the primary pressure is positive or negative by performing predetermined operation on the proportional coefficient, integral coefficient, and derivative coefficient using values obtained by assigning the flow rate set value to a predetermined function, respectively, and changes the proportional coefficient, integral coefficient, and derivative coefficient based on the flow rate set value by performing predetermined operation on the proportional coefficient, integral coefficient, and derivative coefficient using values obtained by assigning the primary pressure to a predetermined function, respectively.

* * * * *